United States Patent [19]

Bethke et al.

[11] Patent Number: 5,448,243
[45] Date of Patent: Sep. 5, 1995

[54] SYSTEM FOR LOCATING A PLURALITY OF OBJECTS AND OBSTRUCTIONS AND FOR DETECTING AND DETERMINING THE ROLLING STATUS OF MOVING OBJECTS, SUCH AS AIRCRAFT, GROUND VEHICLES, AND THE LIKE

[75] Inventors: Karl-Heinz Bethke, Oberpfaffenhofen; Bernd Röde, Seehausen; Arno Schroth, Puchheim, all of Germany

[73] Assignee: Deutsche Forschungsanstalt fur Luft- und Raumfahrt e.V., Cologne, Germany

[21] Appl. No.: 194,984

[22] Filed: Feb. 14, 1994

Related U.S. Application Data

[63] Continuation-in-part of Ser. No. 998,027, Dec. 29, 1992, abandoned.

[30] Foreign Application Priority Data

Dec. 30, 1991 [DE] Germany ............. 41 43 215.0

[51] Int. Cl.⁶ ............................................. G01S 13/93
[52] U.S. Cl. ......................................... 342/59; 342/29; 342/457; 342/36
[58] Field of Search ................. 342/28, 36, 29, 41, 342/59, 457

[56] References Cited

U.S. PATENT DOCUMENTS

| | | | |
|---|---|---|---|
| 3,665,464 | 5/1972 | Meilander | 342/36 |
| 3,870,994 | 3/1975 | McCormick et al. | 342/42 |
| 4,060,805 | 11/1977 | McComas | 342/38 |
| 4,213,126 | 7/1980 | Mulder et al. | 342/36 |
| 4,319,243 | 3/1982 | Vachenauer et al. | 342/37 |
| 4,418,349 | 11/1983 | Höfgen et al. | 342/454 |
| 4,499,468 | 2/1985 | Montana et al. | 342/463 X |
| 4,782,450 | 11/1988 | Flax | 364/461 |
| 4,918,610 | 4/1990 | Becker | 364/451 |
| 5,144,315 | 9/1992 | Schwab et al. | 342/49 |
| 5,166,694 | 11/1992 | Russell et al. | 342/457 |
| 5,179,384 | 1/1993 | De Haan | 342/37 |
| 5,208,756 | 5/1993 | Song | 364/449 |
| 5,268,698 | 12/1993 | Smith, Sr. et al. | 342/450 |
| 5,334,982 | 8/1994 | Owen | 342/36 |

FOREIGN PATENT DOCUMENTS

0016417 3/1980 European Pat. Off. .
2165414 4/1986 United Kingdom .

Primary Examiner—John B. Sotomayor
Attorney, Agent, or Firm—Browdy and Neimark

[57] ABSTRACT

In a system for locating a plurality of objects and obstructions and for detecting and determining the rolling status of moving objects, such as aircraft, ground vehicles, and the like, in the area of an airport, a short-range radar network is provided having at least three radar stations. Via simple stationary non-rotating transmitting antennas with coherent time-pulsed microwaves or other microwave signal forms, a large sector in the azimuth of about 90° is illuminated, and the associated fixed receiving antennas, which have fixed subdivided sector characteristics, with one receiving channel per subsector, also receive signals from the other stations for bistatic measurements. The separation of the signals of individual stations is effected by selecting different frequencies, or alternatively, a time triggering of transmitted signals and receiver gates or by station-specific modulation codes. Illumination zones are chosen so there are no shadow zones caused by, e.g., buildings.

19 Claims, 10 Drawing Sheets

SYSTEM FOR LOCATING A PLURALITY OF OBJECTS AND OBSTRUCTIONS AND FOR DETECTING AND DETERMINING THE ROLLING STATUS OF MOVING OBJECTS, SUCH AS AIRCRAFT, GROUND VEHICLES, AND THE LIKE

This is a CIP of parent application Ser. No. 07/998,027, filed Dec. 29, 1992 now abandoned, the contents of which are hereby incorporated by reference.

BACKGROUND OF THE INVENTION

1. Field of the Invention

The invention relates to a system for locating a plurality of objects and obstructions and for detecting and determining the rolling status of moving objects, such as aircraft, ground vehicles. and the like, in the region of an airport, comprising a plurality of transmitting and receiving stations (radar stations) and a central station.

2. Description of the Prior Art

Due to improvements in instrument landing systems (ILS), approaches and landings at airports under poor weather conditions no longer present any problems. However, real problems are evident in the subsequent taxiing or rolling phase between runways and gates. With high traffic density, nighttime darkness and/or poor weather conditions, tower controllers do not know the exact position of all aircraft or ground vehicles, such as the so-called follow-me cars, at the airport, and furthermore, pilots do not know their exact position at the airport. Due to poor visibility, obstructions, such as detached engine cowlings, lost luggage trailers, stray service vehicles, and aircraft, represent a great danger.

Until now the ground traffic control is regulated by visual observation of the situation by controllers and pilots. With poor visibility it is therefore necessary to greatly reduce the traffic density. Aircrafts are guided at critical points by optical signals and radiotelephony.

At some major airports, so-called airport monitoring primary radar equipment is also available, and is referred to as airport surface detection equipment (ASDE). Even when this radar is mounted on a tower, shadows of aircrafts with respect to one another and particularly, shadows caused by buildings occur in significant regions of the airport area. Due to multipath propagations of the radar signals, false targets may also be detected. Moreover, the direct determination of the speed vector of individual objects is not possible. It is likewise impossible to determine the direction of a vehicle's longitudinal axis and its identity.

In DE 29 34 844 A1, a cooperative method, in the form of an airport monitoring system, is described. For monitoring only one runway of an airport with a length of, for example, 4 km, a large number of ground devices are required. Location is possible only within the order of magnitude of the mutual distances of the sensors; The actual rolling status, i.e. position, velocity vector, vehicle alignment and identity can be detected only to a very limited extent. Classification and determination of aircraft alignment is not possible at all.

The secondary surveillance radar (SSR) is presently used in aviation solely for monitoring flight traffic from the ground. Aircraft position is determined by measuring the slant range and the azimuth angle. Furthermore, when activated by an interrogation signal from the SSR, the aircraft transponder transmits a code for distance measurement and identification purposes. To increase the capacity of the system, the new mode S has been defined and standardized. Introduction thereof has started in the USA. In contrast to normal SSR, some features of the SSR mode S make it very suitable for ground traffic control as well.

The problems in cooperative methods, and thus, in cooperative rolling status detection (RSD), reside in very few aircraft and ground vehicles being equipped with mode S transponders in the next few years. Even in the remote future of general aviation, a great number of aircraft will not have this type of transponder.

To increase the capacity of an airport, and in particular, to maintain safety for rolling traffic under poor weather conditions, new methods must be developed and introduced for ground traffic control to overcome the difficulties mentioned above. An essential component of future ground traffic control systems will be sensor systems for detecting the rolling status of aircraft and vehicular traffic and the presence of any obstructions on the ground at the airport. The rolling status is made up of a vehicle's position, its speed vector, the direction of the vehicle's longitudinal axis, its so-called heading, and its identity.

For locating obstructions and for detecting the rolling status of objects such as aircraft, ground vehicles, and the like, which do not have a mode S transponder, a so-called non-cooperative method will always be necessary, such as, for instance, primary radar techniques in which the scattering of electromagnetic waves at objects is utilized for location. A further important aspect of the primary radar technique is that it can be implemented independently of international standardizing steps. The cooperative and non-cooperative rolling status detection methods do not conflict, but rather supplement each other in an expedient manner.

In D E 21 44 533 B2, a radar traffic surveillance system is described for airports in particular, that monitors the landing area, the runways and the taxiways. This surveillance system represents a non-cooperative method which can monitor only a single runway. Surveillance of extended areas, such as the entire airport or even only the so-called airport apron in front of the terminals, cannot be conducted with this system. In these areas it is not possible to monitor several objects simultaneously. In addition, fixed objects are not detected at all and determination of the rolling status is possible only to a very restricted degree.

Furthermore, in DE-AS 1,240,950, an air traffic surveillance system is known, which likewise represents a non-cooperative method, and like the surveillance system described above, cannot cope with multiple objects. Consequently, it is not being used for ground traffic control. A separation of targets is possible only in the specific case where aircrafts are spatially well separated from each other in the air space, e.g., different airways.

Figure 5:
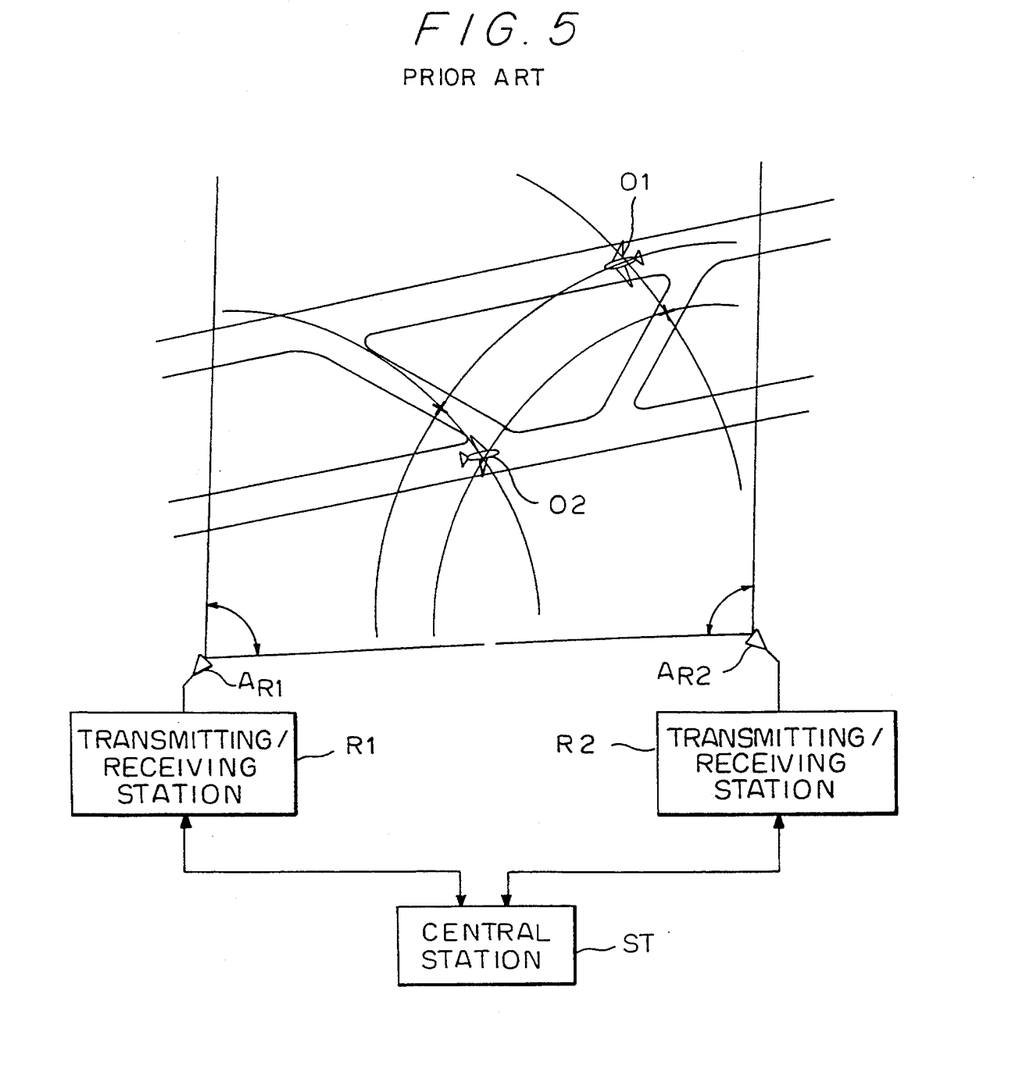
FIG. 5 shows a schematic setup of a short-range radar network having only two radar stations with stationary transmitting and receiving antennas for illustrating the erroneous location of objects.

FIG. 5 is a simplified representation of the area of an airport taxiway with only two vehicles 01 and 02 in the form of aircrafts. Location of aircraft position is performed by means of two radar stations R1 and R2 with antennas AR1 and AR2 associated therewith. It is known that objects 01 and 02 can be located by monostatic echo delay time measurements from two radar stations R1 and R2 in which the transmitting and receiving antennas are both at the same location, or by bistatic echo delay time measurements from two radar stations in which the transmitter and receiver are spatially separated. Nevertheless, these arrangements are not suitable for locating a large number of objects (for example a few hundred objects), as must be monitored in the surveillance area of a major airport, because these arrangements cannot detect multiple objects.

Since all objects within an illuminated region which are located in the same range zone, as represented in FIG. 5 by concentric circular segments, contribute to a backscatter signal of said range zone, erroneous locations occur even with just two objects (e.g. in the form of the objects 01 and 02). In FIG. 5, these false objects are denoted by "X". On airport aprons where many objects can have practically any position, the location results from employing two radar stations only can therefore be referred to as "chaotic".

SUMMARY OF THE INVENTION

The invention therefore has as its object the provision of a system for locating a plurality of objects and obstructions and for detecting and determining the rolling status of moving objects, such as aircraft, ground vehicles, and the like, in all areas of an airport where vehicles have access. Particularly under conditions of poor visibility, moving objects such as aircraft and ground vehicles can be detected and classified.

The invention proposes a system for locating a plurality of objects and obstructions, and for detecting and determining the rolling status of moving objects, such as aircraft, ground vehicles and the like, in the area of an airport, the improvement comprising a short-range radar network (SRW) having at least three radar stations, from which a large sector in the azimuth of about 90° is illuminated with coherent time-pulsed microwaves via simple stationary non rotating transmitting antennas. Stationary non-rotating receiving antennas having fixed divided sector characteristics and one receiving channel per subsector are associated with the transmitting antennas, and when used for bistatic measurements, also receive signals from another station. Besides time-pulsed microwaves, other microwave signal forms may also be used to achieve the desired range resolution. A spread spectrum technique is preferred, wherein each transmitter is modulated with an individual phase code, so that by changing the reference codes in the receiver correlators, any receiving station can form at any time with any transmitter a monostatic and bistatic measuring arrangement.

The separation of signals from individual stations is effected by selecting different frequencies or time triggering of transmitted signals and receiver gates, or by station-specific modulation codes. Illumination zones are selected in such a manner that no shadow zones (e.g. buildings) occur.

Since multiple object or target capability is an essential feature of the system according to the present invention, hundreds of stationary and moving objects present in a modern major airport can also be simultaneously detected. Furthermore, with this system, a minimum technical expenditure with high reliability and easy maintenance is ensured.

Thus, a short range radar network is provided comprising several modules of at least three radar stations, each with stationary non-rotating transmitting/receiving antennas which are positioned at different locations and which have wide azimuth sector characteristics. As for illuminating defined airport regions, the radiation patterns of the radar station antennas must have a substantially sector-like characteristic in the horizontal plane, i.e. in the azimuth, while the patterns in the elevation plane have the usual lobe form with a 3 dB-width of about 4°.

Figure 1:
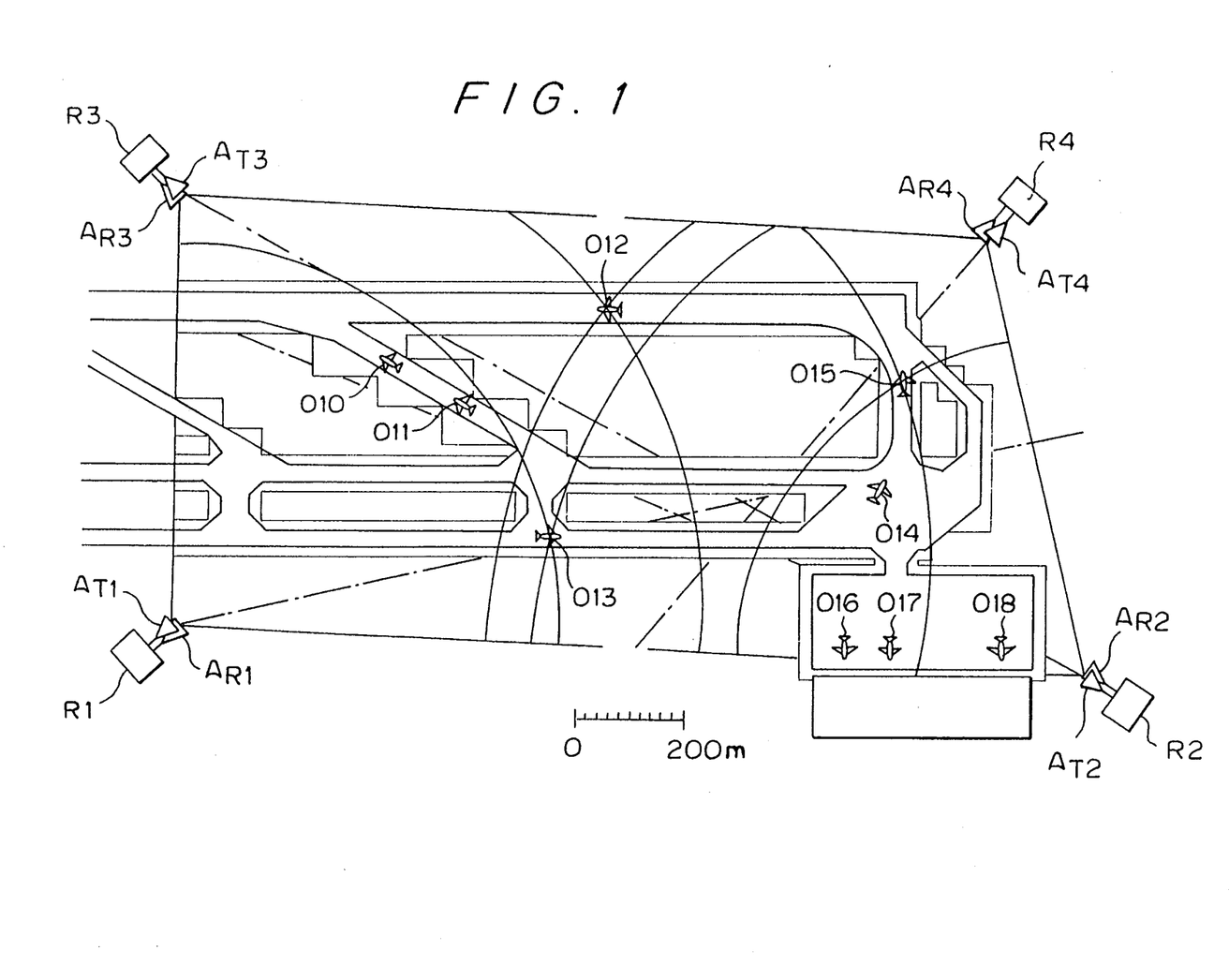
FIG. 1 is a plan view of a subarea of the Munich airport indicating regions of illumination for four radar stations for detecting the rolling status at the airport.
Figure 6:
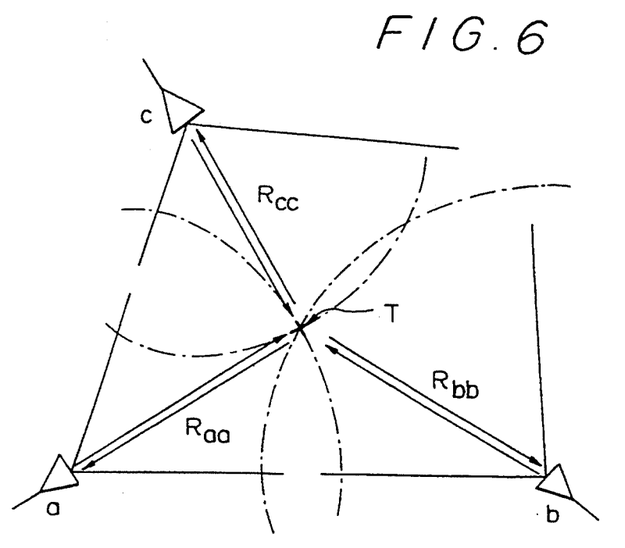
FIGS. 6–8 illustrate a radar target inside a module of a short-range radar network.

The azimuth sector characteristic reduces false echoes due to multipath propagation, such as those caused by reflections from airport buildings. For this purpose, the antenna characteristic is divided into at least two subsectors, and by comparing the delay times and the location results from at least three individual stations of the short-range radar network (SRN), false echoes can easily be identified. If the transmitting and receiving antennas are spatially separated, the probability of erroneous locations can further be reduced by means of bistatic measurements between individual stations. The sum delay (transit) time measurements can be carried out with the aid of ellipsoidal location lines (FIG. 7), and differential delay time measurements with the aid of hyperbolic location lines (FIG. 6). Furthermore, in SRN, antennas of adjacent stations, from which the station pairs are formed for monostatic delay time measurement, have a common antenna beam boundary (FIGS. 1 and 6). This avoids ambiguous double sections of two intersecting arcs. Due to the flexibility in the choice of sector boundaries in the SRN modules, shadow zones and undesirable reflections at buildings, etc., can be avoided.

With the system of the present invention, measurements can be carried out both at night and, in particular, under poor weather conditions, such as the reduced visibility encountered with fog. By evaluating delay time measurements from individual stations, objects or targets within a jointly illuminated area can be located and tracked. It is then possible to determine from these results the speed vector and the composition of a track. Fundamentally, each station on its own is able to generate two-dimensional high-resolution microwave images of vehicles which are moving within the illuminated area, irrespective of the range from each station. By evaluating the two-dimensional microwave images of moving objects and targets, it is then also possible to classify objects and to determine the direction of the vehicle longitudinal axis, such as of that an aircraft.

In contrast to a conventional central airport surveillance radar, the SRN has a modular structure that covers the entire area. The individual radar stations are positioned so that shadows caused by buildings are largely avoided. Due to the small ranges to be monitored within an SRN module only radiation densities considerably lower than for a central surveillance radar are necessary.

Furthermore, an advantage with the short-range radar network according to the invention is that all the individual stations can receive the echo signals initiated by themselves or by other stations. This makes it possible to form so-called bistatic measuring geometries in which the transmitting and receiving antennas are spatially separate. Since the scattering of the radar signals, which usually represent time-pulsed electromagnetic waves, is generally not isotropic, compared with a monostatic measurement in which the transmitting and receiving antenna are identical, with such bistatic measurements, important additional information can be obtained regarding the location, object longitudinal direction or heading, and classification of the objects.

By setting up at least three radar stations having spatially fixed wide antenna directional patterns which, depending upon requirements in the azimuth, cover an area of about 90° and in the elevation only about 4°, all objects within a subarea of an airport to be monitored can be illuminated.

BRIEF DESCRIPTION OF THE DRAWINGS

Hereinafter the invention will be explained in detail with the aid of preferred embodiments referred to in the accompanying drawings, wherein.

DESCRIPTION OF THE PREFERRED EMBODIMENTS

Figure 2:
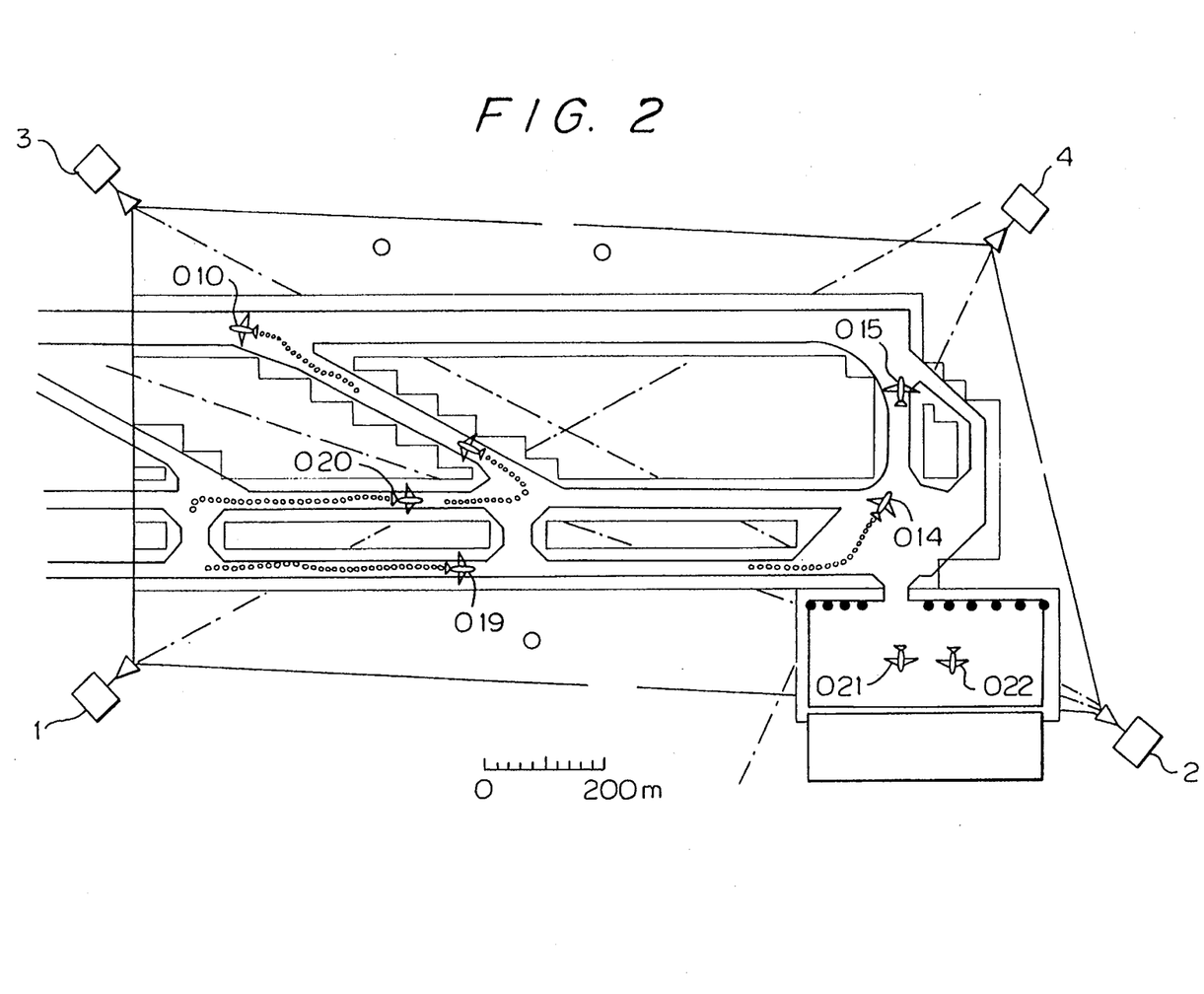
FIG. 2 is again the plan view of a subarea of the Munich airport and the illumination areas of four radar stations having a plurality of located aircraft and obstructions.

FIG. 1 shows a plan view of a scenario at the Munich airport. In addition, the locations of four radar stations R1 to R4, as represented by squares, and the illumination regions of the four radar stations, which represent one module in the SRN, are shown. In FIG. 1, some circular segments shown in full line and concentric with respect to the radar stations R1 and R2 are indicated. They relate to range cells of the two radar stations R1 and R2. Dot-dashed lines indicate one possible configuration of individually different diagram divisions of receiving antennas. By dividing each sector diagram of the receiving antennas $A_{R1}$ to $A_{R4}$ into two subsectors, each with a separate receiver channel, and by comparing the results of the location process with the received echo signals in the corresponding subsectors, practically no erroneous locations occur. Locations of objects which do not correspond with an echo signal in the corresponding subsectors are ghosts. By placing antennas $A_{R1}$ to $A_{R4}$ in suitable positions associated with radar stations R1 to R4, shadow zones are avoided. In a dynamic image, i.e. in a representation of location results for several points in time, when a large number of moving objects are present, as is apparent from FIG. 2, only brief location inaccuracies occur and these can be suppressed with a filter (in the software). In FIG. 2, there are 21 objects shown; 13 obstructions in the form of fixed objects denoted by "o" and 8 detected objects, aircrafts 010, 011, 014, 015 and 019 to 022, the represented tracks of which correspond to a measuring time of 32 s.

A combination of the radar stations R1 and R2, R1 and R3, as well as R2 and R4 represents an economic optimum. By the additional use of the radar station pair R3 and R4, a momentary location inaccuracy can be further reduced. The 13 known fixed objects denoted by "o" can be suppressed by computer-controlled time blanking of the receivers or by a compensation of the complex echo signals with the stored measured values for the initial situation (no moving objects).

Within the scope of redundant information, echo selection is made with regard to minimizing possible disturbance due to multipath propagations. Although a wider directional characteristic of the individual antennas would be desirable with regard to the number of radar stations required because of overlapping of their illumination zones in the azimuth, this would entail the use of larger transmitting power for a given receiver sensitivity. Furthermore, the propagation conditions of the signals would be considerably impaired.

A system for locating a plurality of objects and obstructions and for determining the rolling status of moving objects comprises at least three, preferably four or more, coherent, usually pulsed, radar stations localized near the border of the airport field and on top of buildings, a central signal processing and control unit as well as a communication network for connecting the individual radar stations to the central station. Inside a module, this will be accomplished by wireless transmission of the measured and digitized range profiles from the secondary radar stations to the main station via the radar link (FIG. 9).

Figure 9:
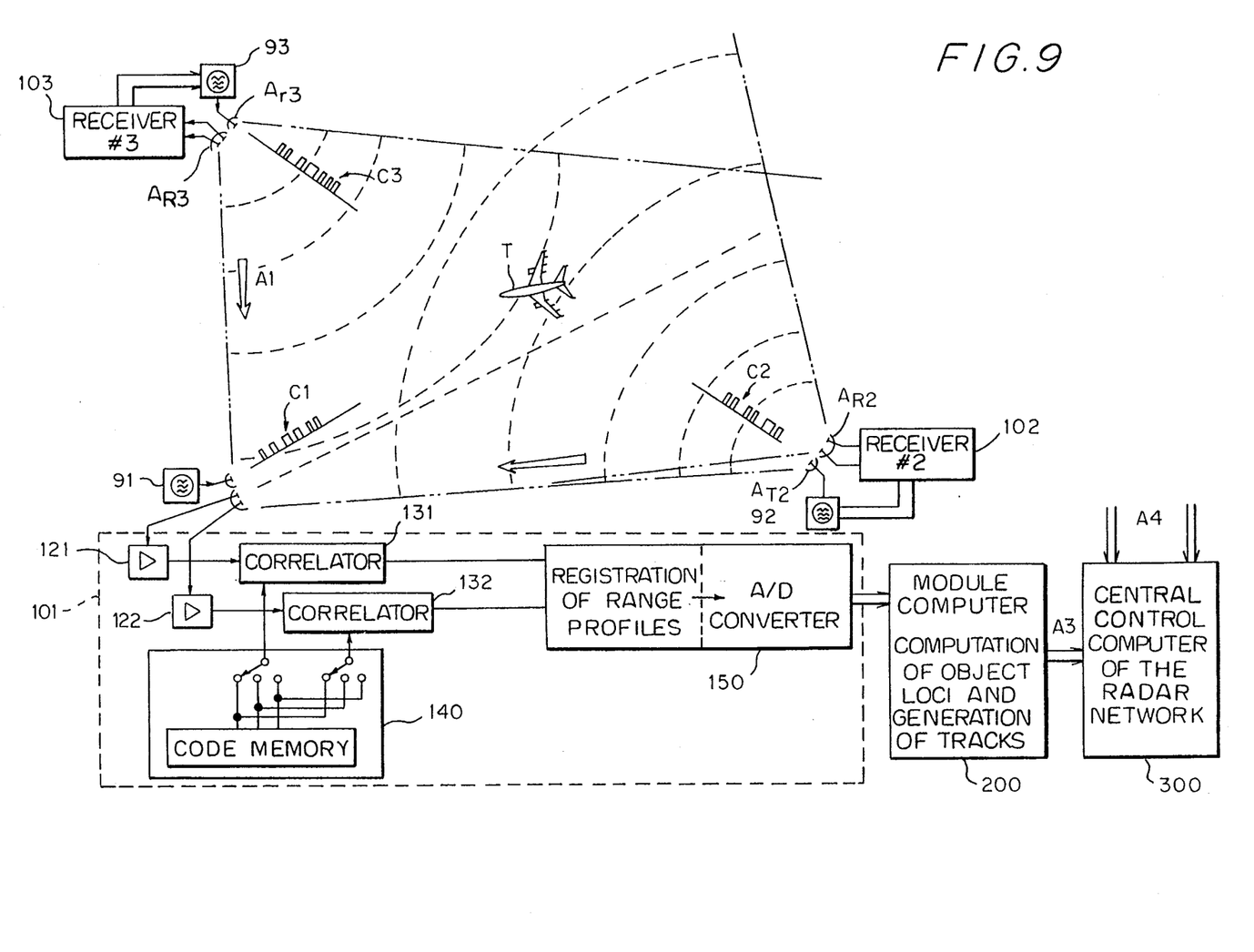
FIG. 9 illustrates one module of the radar network.

FIG. 9 shows module #1 of the radar network. A target aircraft T is disposed between stations having first, second, and third transmitters 91, 92, and 93 and associated receivers 101 (shown by dashed rectangle), 102, and 103. The station with transmitter 91 and receiver 101 is the main (primary) sensor station of the module; the others are secondary sensor stations. Transmitters 91, 92, and 93 beam respective pulse compression codes C1, C2, and C3 to the target T. The arrows from receiver 103 to transmitter 93 and from 102 to 92 indicate range profile data.

The dash-dot-dot lines are the antenna sector beams. The upper line is that of $A_{T3}$ and $A_{R3}$; The line on the right side is that of $A_{T2}$ and $A_{R2}$. The downward arrow A1 at the left side indicates transmission of measured range profiles during pauses of radar operation, while the left-pointing arrow A2 at the bottom indicates data transmission. The area below the dashed line from the primary sensor station which bisects the target area is the right sector of receiver 101.

Receiver 101 includes left-channel amplifier 121 and right-channel amplifier 122; left-channel correlator 131 and right-channel correlator 132; and code selector 140. The box labeled 150 performs registration and A/D conversion, and feeds to a module computer 200. The computer 200 in turn feeds (via arrow A3, indicating data of object tracks) to the central control computer of the radar network 300, which also accepts (via arrows A4) data from other modules.

Figure 7:
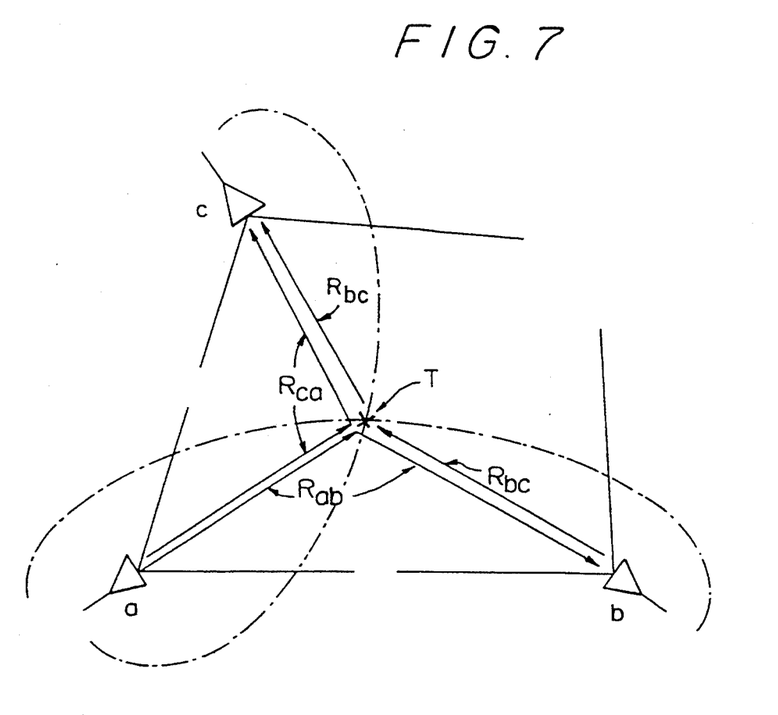
Figure 8:
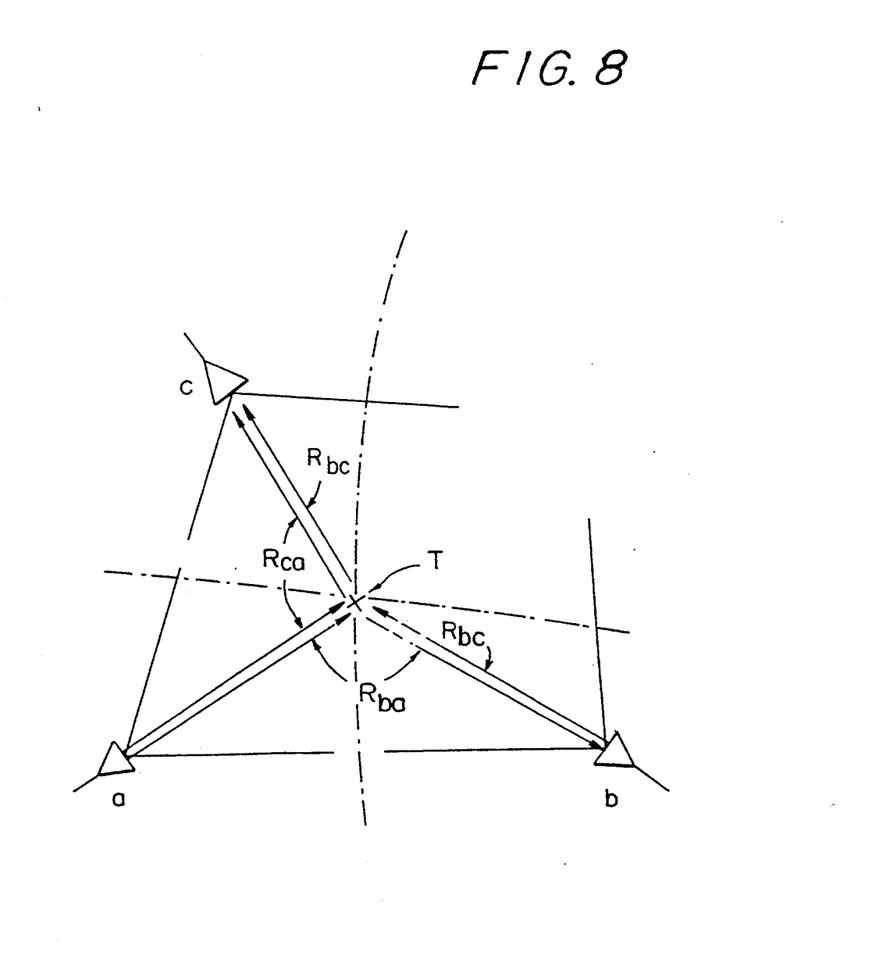
Figure 10:
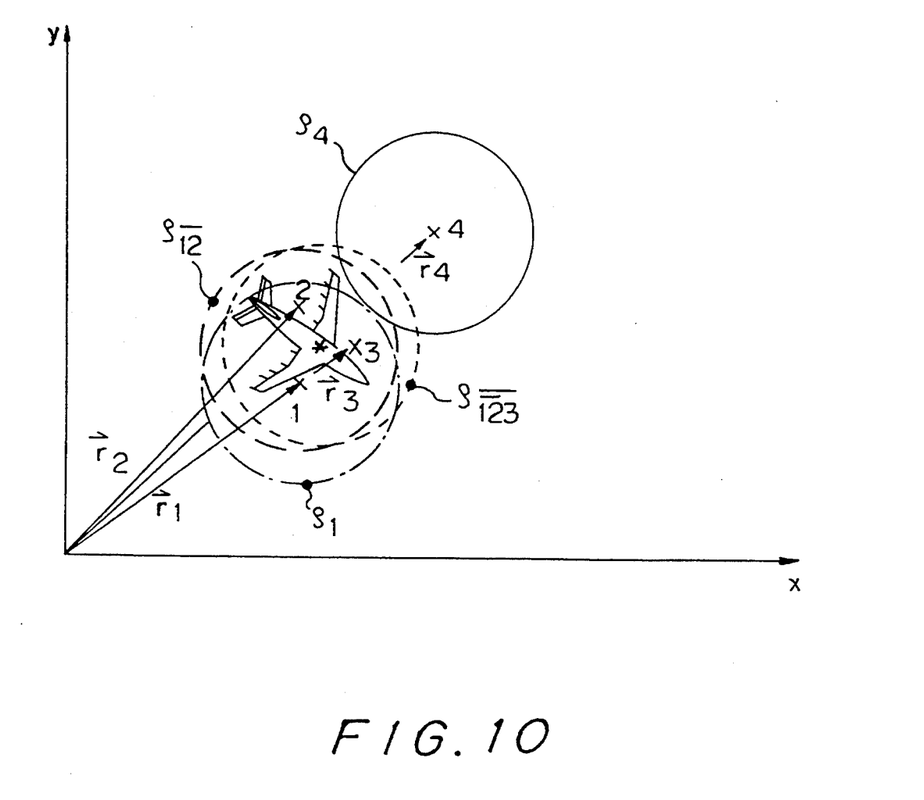
FIG. 10 illustrates the cluster analysis using the criterion of minimal mutual distance measure ($p$).

Locating individual objects by means of delay time measurements is carried out by detecting the echo signals of all the illuminated scatterers in all stations in radially equidistant range intervals, either by tomographic projections of the echo signals, which means a uniform distribution of the backscatter echo of a range zone (a range cell) over the entire corresponding circular segment, or preferably by calculating the intersection coordinates of intersecting arcs which define the loci of identical echo delay times (FIG. 6). In FIG. 6, the dotted lines are circular arcs which are loci of constant delay times. The monostatic paths are given by:

$$R_{aa} = R_{aT} + R_{Ta}$$

$$R_{bb} = R_{bT} + R_{Tb}$$

$$R_{cc} = R_{cT} + R_{Tc}$$

where T is the target. In addition, it is possible that locating individual objects can be carried out by means of a differential multilateration (FIG. 8), which corresponds to a hyperbolic location In FIG. 8 the two hyperbolas describe all loci where a given arrival time difference of pulses from stations a and b can be observed. The bistatic paths for difference transit times are:

$$R_{ba} - R_{ac} = (R_{aT} + R_{Tb}) - (R_{aT} + R_{Tc})$$

$$R_{bc} - R_{ba} = (R_{bT} + R_{Tc}) - (R_{bT} + R_{Ta})$$

where T is the target and $R_{ac} = R_{ca}$, $R_{bc} = R_{cb}$, and $R_{ab} = R_{ba}$. Location can also be carried out or by means of a sum multilateration, which corresponds to an ellipsoidal location line (FIG. 7). In FIG. 7 the ellipsis describes all loci of constant delay (transit) times between stations a and c. The bistatic paths for sum transit times are:

$$R_{ac} = R_{aT} + R_{Tc}$$

$$R_{ab} = R_{aT} + R_{Tb}$$

$$R_{ac} = R_{bT} + R_{Tc}$$

where T is the target, and where $R_{ca} + R_{ac}$, $R_{bc} = R_{cb}$, and $R_{ab} = R_{ba}$. The location of extended objects, compared to the dimension of range resolution, generally will result in clouds of intersection points, and hence, location results. Location of different neighboring objects is achieved by separating the ensembles of scattering centers from these objects, as well as separating "clouds" of individual scattering centers realized by a cluster analysis using a particular cluster criterion of a "minimal mutual distance measure" (FIG. 10), and eventually by digital filtering the above-mentioned results over several measurements to reduce statistical fluctuations of object coordinates. In FIG. 10 where δ = characteristic dimension,
$\vec{v}$ = speed vector,
N = number of locations,
$\vec{r_1} \ldots \vec{r_4}$ = location vectors, and
Δ, * = averaged results, we have:

$$\zeta = f(\vec{v_m} \cdot \vec{v_n}, |\vec{r_m} - \vec{r_n}|), \ 1 \leq m, n \leq N$$

$$\vec{r_{\Delta,12}} = \begin{bmatrix} (x_1 + x_2)/2 \\ (y_1 + y_2)/2 \end{bmatrix}$$

and $$\vec{r_{*,123}} = \begin{bmatrix} (2/3)x_{12} + (1/3)x_3 \\ (2/3)y_{12} + (1/3)y_3 \end{bmatrix}$$

As opposed to conventional radar where angular resolution is defined by the radiation pattern (of a narrow major lobe) of the rotating antenna, an illumination as uniform as possible over a large azimuth angle range in the short-range radar network is carried out with the radiation intensity rapidly dropping to very low values at the edges. As a result the echo signals of all the scatterers located within the same range cell are superimposed to give a resultant total signal. Consequently, each range zone defines the radius of an annular sector, the center of curvature of which coincides with the phase center of the respective antenna.

A range-wise weighting of the echoes is carried out in accordance with the pulse shape of the transmitted signal and the time engagement of the receiver as well as the filter properties thereof. Calculation of coordinates for the intersections of circular segments from a plurality of usually adjacent stations defines the locations of the scatterers. The antennas $A_{R1}$ to $A_{R4}$ of the individual radar stations R1 to R4 are arranged so that the antennas of adjacent stations always have a common antenna beam border, as indicated in FIG. 1. This avoids ambiguous double intersections of two arcs allocated to adjacent radar stations.

In the case of complex objects, as represented by ground vehicles and aircraft, each of the individual stations R1 to R4 receives an echo of adequate strength. In the case of the short-range radar network, the resolution of scattering centers of objects in the measuring plane is defined by the radial extent of the range cells and is thus independent of the range. In contrast, the azimuthal resolution of conventional radar becomes increasingly poorer with increasing distance from the radar.

By choosing narrow range cells of about one meter (corresponding to pulse widths of about 6 ns) the characteristic dimensions of aircraft can be determined by means of microwave images derived from tomographic projections. These can be employed for classification and for determining vehicle heading.

As already explained above, multipath propagations of the signals such as by reflection at buildings, can lead to misinterpretations. However, with the aid of the short-range radar network there are several possibilities for identifying these disturbance signals and for suppressing them in subsequent processing. In addition, position determination can be carried out, if necessary, with the aid of position lines of constant difference and sum delay time between any two of the participating stations. Two positioning lines must always be brought to a clearly defined intersection. Ambiguities caused by multiple intersections of individual position lines are not relevant and can be resolved by the addition of further position lines. Clutter targets inside monitored sectors are suppressed by blanking out the signal content of the corresponding range cell or, alternatively, by shifting the detection threshold level for this cell to a level above the clutter level With regard to the disturbance of wave propagation at airports, the same aspects apply here as in the cooperative rolling status detection by means of SSR mode S. This means that the antenna locations can be identical for both methods, i.e. the short range radar network and SSR mode S. Consequently, the existing expensive infrastructure, such as antenna supports, cable wells, power supply, etc., can also be utilized.

The method of tomographic projections described above requires a uniform scattering behavior of the scattering centers over relatively large angular areas, a requirement very rarely observed in practice. With this method, object identification or classification and the determination of the direction of the vehicle's longitudinal axis can be obtained only to a limited extent. Substantially better microwave images are generated by constructing a "synthetic aperture" for each individual station.

The composition of an unequivocal track for each of the moving objects, for example, aircrafts 010, 011, 014, 015, 019 and 020 in FIG. 2, is an essential requirement for the generation of microwave images for classification purposes. Various algorithms are known for classification of objects. They require input measurement data fields, for example, in the form of microwave images, which are characteristic of the object. By suitable "combinations" of microwave images, for example, via a "knowledge base", an object classification can then be performed. Most recently, object classification is frequently carried out by means of so-called "neural networks" which are optimized via a learning process.

By the relative movement between object and radar station, a so- called "synthetic aperture", meaning a synthetic array of radiators, is realized. As opposed to Synthetic Aperture Radar (SAR), the object, and not the radar, moves in the present case, and for this reason the expression, inverse synthetic aperture radar (ISAR) is used. To reduce computing expenditure, the track of objects is approximated by circular arcs. In the object-fixed coordinate system the radar station moves on a circular segment, the geometry of which is defined by the distance between the radar and the object and the aspect angle variation $\Delta\theta$.

In the present plane case, the "synthetic aperture" is therefore reduced to an antenna array where radiators lie on the arc and the virtual element interval $\delta\theta$ is defined by the time interval of the measurements and the object speed. The consecutively measured echo signals are corrected with regard to the different delay or transit times. This provides the "synthetic manner" of the above-mentioned antenna array, the extent being decisive for the resolution of the microwave image and the "element" interval which is decisive for the maximum size of the objects to be measured.

The synthetic array is focused on each object separately by means of signal processing; i.e., the other objects located in the illumination zone disappear due to an averaging in the signal noise. In the case of the selected object, where the position and track are known from the locating mode, focusing for each resolution cell (pixel) is carried out via signal processing.

Figure 3:
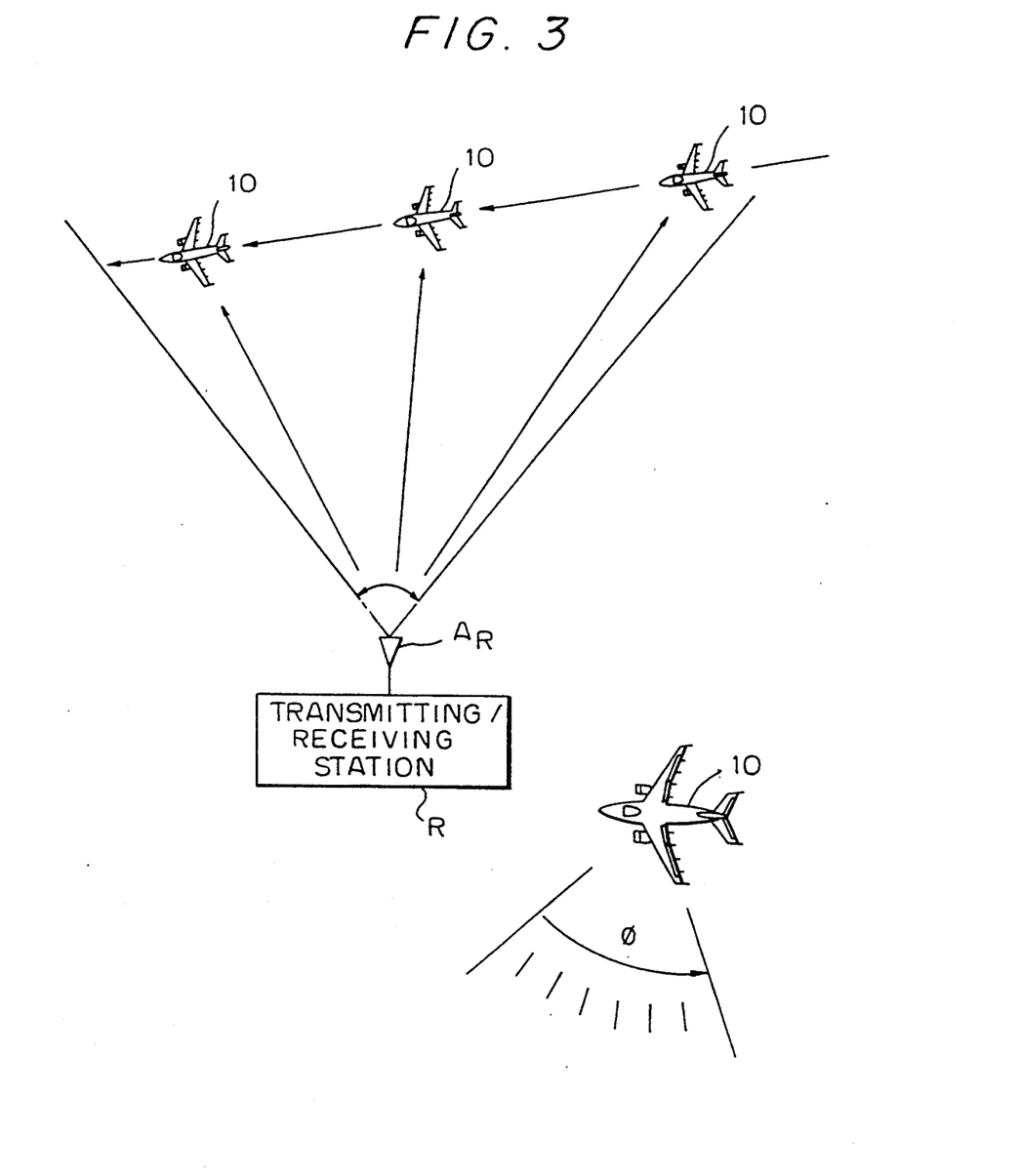
FIG. 3 is a schematic illustration of the principle of microwave imaging by means of a synthetic aperture.

The principle of microwave imaging by means of a synthetic aperture that results in a monostatic geometry is shown in FIG. 3. For simplicity of illustration in FIG. 3, only one transmitting/receiving station R with an associated antenna $A_R$ is presented with the illumination zone being shown in the azimuth. For the case of a bistatic measurement and in contrast to the illustration in FIG. 3, the transmitting and receiving antennas separately belong to different stations. With the aid of varying azimuth aspects, the translational movement of a vehicle (e.g., aircraft 10) through the antenna beam can be reduced to a relative rotational movement. The size of the resultant synthetic aperture necessary for the transverse resolution is restricted only to a small portion (e.g. 1°) of the total azimuth aspect angle range which can be employed for the imaging. Thus, the movement of the objects to be detected, which are located within the illumination region of the particular antenna, is utilized, whereas stationary objects cannot be imaged.

To simplify the algorithms, the particular travel path is approximated by straight or circular segments because in order to obtain a transverse resolution (azimuth) of one meter with a desired signal frequency at cm wavelength, only the backscatter data for an aspect angular interval of about 1° are to be processed. Uniform scattering properties and movements of the objects are presumed only over this small angular range. The angular increment between the individual measurements is defined by the maximum size of the objects to be identified. The synthetic aperture is generated by correction of the complex echo signals, with usually only the phase having to be corrected in accordance with the values generated by the relative rotational movement of the objects. The relative rotational movement gives a circular antenna array, the element interval of which is defined by the angular increments. The relative movement is known from the use of the location method already described above. FIG. 3 also shows the azimuth aspect angle range of the aircraft 10, denoted by An essential feature of the synthetic aperture is the range-independent resolution in the azimuth because the size of the aperture corresponds to the travel path of the object observed within the processing angle.

Figure 4A:
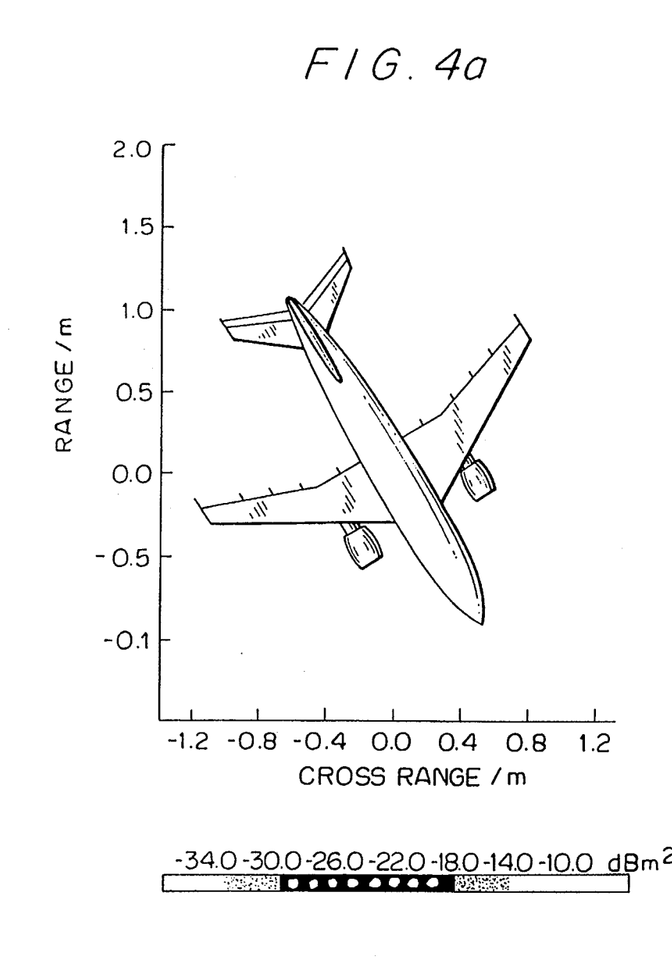
FIGS. 4a and 4b are two typical graphical microwave images of an Airbus A 310 aircraft (scaled 1:20) for horizontal polarization.
Figure 4B:
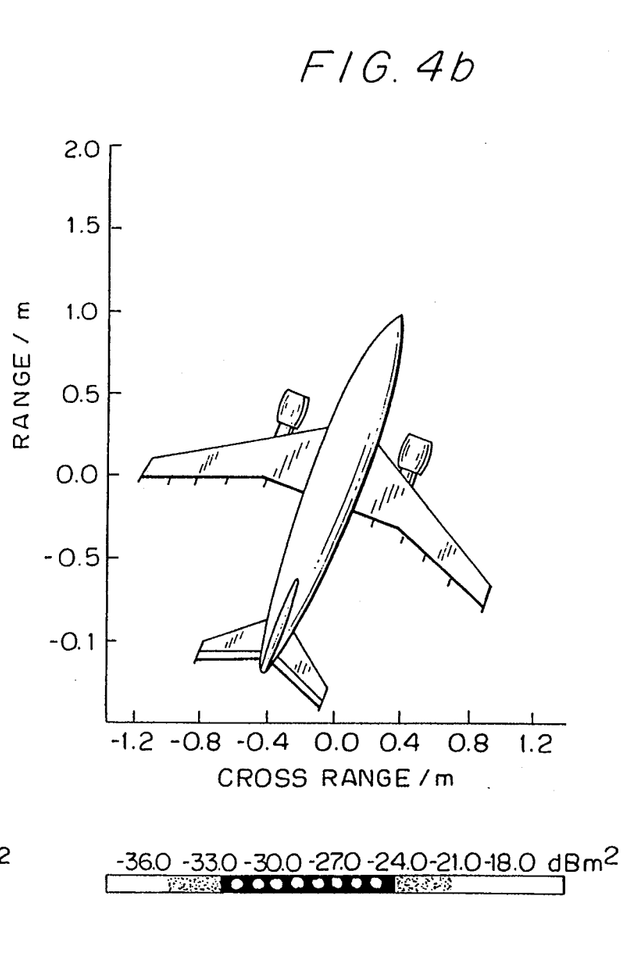

In FIGS. 4a and 4b, microwave images of an aircraft model (scale 1:20), such as an Airbus A 310, are shown for two different aspect angles with horizontal polarization being used for transmitting and receiving. In FIGS. 4a and 4b, the cross range (abscissa) is shown in meters (m) and the range (ordinate), likewise, is also shown in meters (m). For the recording shown in FIGS. 4a and 4b, the frequency is 12.5 GHz and the backscatter cross-sections are measured in $dBm^2$.

By measuring and evaluating complex echoes of moving objects with the aid of stationary antennas from several stations, microwave images are thus obtained from several aspects for classification of these objects and if necessary, for determining the longitudinal orientation.

By a corresponding evaluation of such images for two or more aspect angles and by utilization of polarization-dependent properties of the scattered field, excellent object classification is possible on a knowledge basis (in the form of a data base).

Since the objects are illuminated with monochromatic waves from specific directions, only a few scattering centers contribute to the scattered field. Depending on object geometry, a case may occur for simple bodies where practically no signal capable of being evaluated is backscattered for certain illumination directions; however, these gaps are automatically bridged by the relative movement of the objects.

Consequently, for reliable detection and locating in the case of stationary objects, a system redundancy is necessary. This redundancy can be obtained either by setting up additional radar stations or by making bistatic measurements. Moreover, by utilizing bistatic geometries, additional microwave images can be generated which fill the gaps for images obtained from monostatic measurements.

Furthermore, with the aid of microwave images, false echoes caused by multipath propagation can be identified since multipath signals travel a longer path than the direct signal between the respective radar stations and the object. However, the imaging algorithm presumes direct signal propagation for all signals. Consequently, depending on the particular propagation conditions, false objects or clutter structures may appear in the microwave image. However, these clutter structures appear in microwave images for individual radar stations at different positions, governed by the changing geometric conditions, and can thus be easily identified.

Figure 11A:
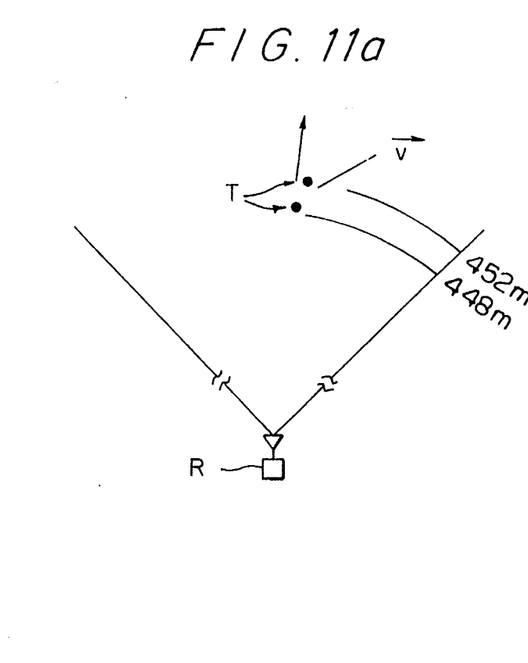
FIGS. 11a and 11b illustrates range migration of a pair of point scatterers during a 2.5-second time interval which defines the radial speed.
Figure 11B:
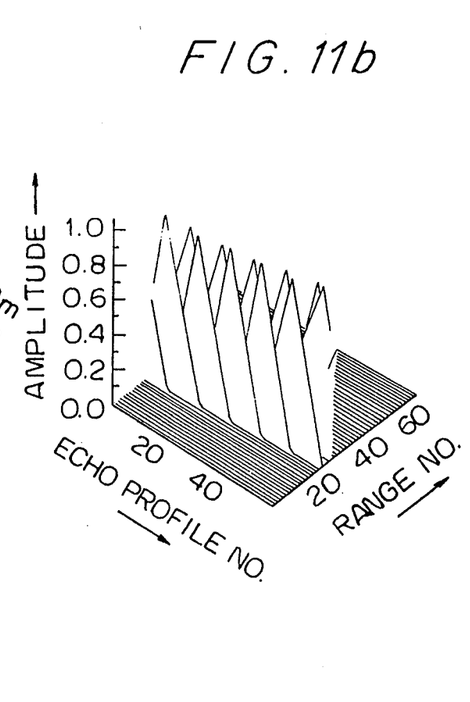

Translational speed vectors of objects or targets can be derived from Doppler shifts observed at least two of the individual radar stations. By correlation of the consecutive echo profiles as measured by the individual stations, the corresponding radial speed of objects can be determined in quasi-real time and requiring less data than the Doppler technique FIGS. 11a and 11b. FIG. 11a shows a radar R on a target T moving away from the radar R with a vector velocity v having a radial velocity component $v_{rad}$ of 23 km/h from a first distance of 448 m to a second distance of 452 m. FIG. 11b is a graph illustrating the amplitudes of echoes as a function of echo profile number and range number. In FIG. 11b the range, cell size is 3 m, the measurement repetition frequency is 25 Hz, the signal frequency is 10 GHz, and the Doppler frequency is 423 Hz.

The short-range radar network described is also suitable for monitoring and controlling road traffic at critical crossings or important locations particularly in dense fog and at night.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A system for locating a plurality of objects and obstructions and for detecting and determining the rolling status of moving objects, such as aircraft, ground vehicles and the like in the region of an airport, including a plurality of transmitting and receiving stations (radar stations including a main station) comprising:

means for permanently illuminating a definite area with coherent microwave radiation from a short-range radar network having at least three radar stations using simple fixed (nonrotating) antennas ($A_T$, $A_R$) with broad sector characteristics of about 90° in the azimuth, said radar network further including fixed receiving antennas ($A_R$) which have two adjacent subsector characteristics with one receiving channel per subsector being associated for suppression of ghost-targets, said receiving channels also comprising identification means for receiving signals from any other selected transmitter within the network, wherein these means of signal identification of other transmitters being effected by selecting different transmitting time-slots or station-specific pulse compression codes.

2. A system according to claim 1, with the ability to determine the positions of a multitude of objects by computing the intersections of arcs describing the loci of constant delay times of significant echoes (exceeding a predetermined threshold) with a precision of a few meters or by superimposing tomographic projections of the echo signals from different transmitters, which means a uniform distribution of the backscatter echo of a range zone (range cell) over the entire corresponding circular segment and by separating the ensembles of scattering centers from different objects as well as separating "clouds" of intersection points caused by different scattering centers by a cluster analysis using a particular cluster criterion of a "minimal mutual distance measure" and eventually by digital filtering the mentioned results over several measurements to reduce statistical fluctuations of the object coordinates.

3. A system according to claim 1, wherein for object classification and for determining an object longitudinal direction (heading) in quasi real time microwave images of detected objects from different measuring aspects of individual stations (e.g., R1, R2, R3) are superimposed.

4. A system according to claim 1, with the ability to determine the positions of a multitude of objects by computing the intersections of arcs describing the loci of constant delay times of significant echoes (exceeding a predetermined threshold) with a precison of a few meters or by superimposing tomographic projections of the echo signals from different transmitters, which means a uniform distribution of the backscatter echo of a range zone (range cell) over the entire corresponding circular segment and by separating the ensembles of scattering centers by a cluster analysis using a particular cluster criterion of a "minimal mutual distance measure" and eventually by digital filtering the mentioned results over several measurements to reduce statistical fluctuations of the object coordinates, wherein for object classifications and for determining an object longitudinal direction (heading) in quasi real time microwave images of detected objects from different measuring aspects of individual stations (e.g., R1, R2, R3) are superimposed.

5. A system according to claim 4, forming bistatic measuring geometries for the location and classification of objects, whereby composed images with important structural details of selected objects are obtained by combining (e.g. by superposition) several microwave images.

6. A system according to claim 1, forming bistatic measuring geometries for the location and classification of objects, whereby composed images with important structural details of selected objects are obtained by combining (e.g. by superposition) several microwave images.

7. A system according to claim 1, wherein each said receiving station permanently measures the complex valued echoes of any predetermined transmitter which originate from the corresponding monitored sectors so that microwave images of all moving objects with high resolution are obtainable, whereby a synthetic antenna array with very large dimensions is generated by processing the measured echo data.

8. A system according to claim 1, wherein for increasing the location accuracy of objects, sum and difference transit times of radar signals between said individual radar stations of the short-range radar network are formed creating additional lines of position (ellipses, hyperbolas) for forming further intersection points.

9. A system according to claim 1, wherein clutter echoes measured with high constant range resolution from said plurality of transmitting and receiving stations are suppressed by blanking out corresponding range cells without significant influence on the overall target signature or, alternatively, by shifting the threshold levels in the corresponding range cells above the clutter level.

10. A system according to claim 1, wherein a self synchronization of the radar network is performed in a predetermined sequence by continuous monitoring of all receivers to the individual signal code from the respective predecessor transmitter which is accomplished by the special broad antenna characteristics.

11. A system according to claim 1, wherein by correlation of consecutive echo profiles measured by the individual stations the radial speed components of objects are determined at low measurement repetition frequencies (in comparison to Doppler measurements).

12. A radar system for locating multiple objects within a horizontal surveillance area, the system comprising:
   at least three transmitters emitting respective pulsed emitted signals, each of the emitted signals being distinguishable according to the particular respective transmitter from which the emitted signal was emitted;
   at least three receivers for detecting a reflected signal reflected from one object;
   the transmitters and receivers being separately deployed about a perimeter of the area;
   the emitted signals being emitted over respective azimuthal arc sectors, the sectors overlapping to cover the area;
   transmitter identification means, associated with each of the receivers, for identifying which one of the transmitters emitted the reflected signal;
   timing means for measuring a delay time to establish a signal path distance from any one of the transmitters, to the object, to any one of the receivers;
   computational means, coupled to the receivers, for locating the object at a point of the area by calculating intersections of arcs originating at respective transmitters, the arcs describing geometrical loci of the delay time,
   wherein the at least three transmitters provide a corresponding number of the reflected signal and of the delay time to locate the point unambiguously; and
   a memory, coupled to the computational means, for storing a plurality of points defining a track of the object when the object moves over the area.

13. The radar system according to claim 12, wherein the area includes a first area and a second area having a boundary in common with the first area, and further comprising:
   a network computer for correlating a first track of the object within the first area and a second track of the object within the second area;
   intermediate memory storage coupled to the network computer for storing selectively the first track and the second track during a predetermined time interval;
   means for communicating track data, control instruction data, and other data between the network computer and the computational means;
   a graphic display, coupled to the network computer, for showing on a screen points where objects are located; and
   an interface for outputting data.

14. The radar system according to claim 12, wherein one of the transmitters and two of the receivers are deployed closely adjacent so as to comprise a radar station, the radar station emitting and receiving the signal over an azimuthal sector, the sector including two staring subsectors having a minimal overlap and covering together an angle substantially equal to 90 degrees, the two receivers each dedicated to a different one of the subsectors,
   whereby false location results may be suppressed.

15. The radar system according to claim 12, wherein the computational means for locating the object at a point and the memory include means for suppressing false objects identifiable by erratic track behavior, the means for suppressing further including a two-dimensional low-pass filter having a time constant predetermined to suppress the false objects.

16. The radar system according to claim 12, wherein each of the signals is emitted on a single carrier frequency and the transmitters consecutively emit the signals in a timed sequence, and including means for the computational means to centrally control trigger times of the sequence and synchronize the radar system.

17. The radar system according to claim 12, wherein the computational means includes a minimal mutual distance measure, whereby if the intersections of arcs do not exactly coincide but instead form clusters, the point may be approximated by a centroid of the cluster.

18. The radar system according to claim 12, wherein the computational means includes means for finding velocity components by calculating correlation coefficients for different time shifts between pairs of range profiles embodying echo intensity versus range, the time shifts being measured at predefined time intervals, resulting in peaks of the coefficients at characteristic time shifts being directly proportional to a radial velocity component.

19. The radar system according to claim 18, further including means for measuring a phase of the reflected signal, and wherein the computational means includes imaging algorithms for providing a size, a heading angle, and a contour of any of the objects.

* * * * *